United States Patent Office 2,982,409
Patented May 2, 1961

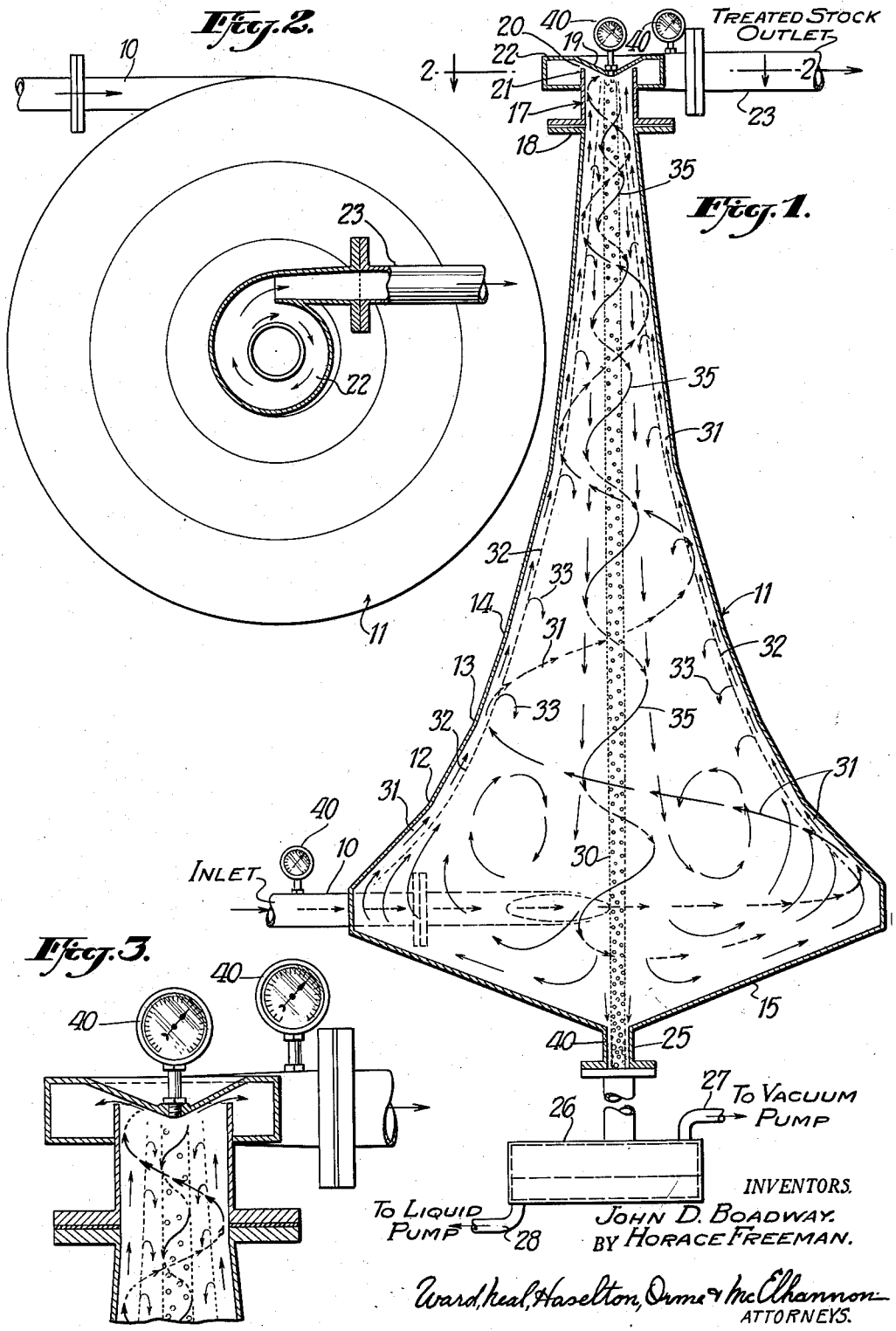

2,982,409

SEPARATION OF FOAM AND OTHER MATERIALS FROM LIQUID MIXTURES ("FOAMJECTOR")

John D. Boadway, Grand'Mere, Quebec, and Horace Freeman, Cap-de-la-Madeleine, Quebec, Canada, assignors, by mesne assignments, to Nichols Engineering and Research Corporation, New York, N.Y., a corporation of Delaware Filed June 10, 1958, Ser. No. 741,129

3 Claims. (Cl. 209—211)

This invention relates to vortex forming apparatus for separating from liquid and liquid mixtures, materials in the nature of foam as well as materials which it is desirable to remove and which tend to accumulate in such foam.

In our co-pending U.S. Application Serial No. 324,561, filed December 6, 1952, (on which Patent No. 2,849,930 has been granted) we have disclosed in connection with Figs. 8–10 thereof, a type of vortex separating device adapted to separate foam from pulp mixtures, particularly such as used for paper making. Such device includes a generally conical chamber portion with the apex end at the bottom and with its side walls so formed that same, in vertical cross-section, are curved more and more steeply toward such apex end and in such manner that the vortices therein will contain a "neutral zone" spaced inwardly of, and extending generally parallel to such curved walls, such "neutral zone" demarking the portion of the vortex outside of which the liquid flows helically downwardly in a relatively thin layer to the apex outlet while in the vortex portions inside of said zone, the liquid tends to flow helically upwardly. That is, along said "neutral zone," the effect of gravity tending to cause particles to spiral downwardly, is balanced by the effect of centrifugal force tending to cause the particles to spiral upwardly; whereas outside the "neutral zone," the liquid tends to spiral downwardly, and inside such zone it tends to spiral upwardly. Meanwhile, bubbles and foam in the vortices are thrown to the central areas of the device, leaving the downwardly spiralling outward portions of the vortex more and more clear of bubbles, while the inner portions spiralling upwardly and which may still contain some bubbles, are gradually thrown to the outer upper portions of the vortex which are of larger diameter and where same are again subjected to centrifugal force treatment as they pass down to the apex outlet.

While such device of said prior application is highly efficient for foam removal, yet is not well adapted for removing, along with the foam, certain materials which tend to accumulate and float therein and are often desired to be removed.

The present invention comprises an improved and alternative form of device which is highly efficient for removing such accumulations along with the foam.

According to the present invention, a vortex chamber is provided in which the apex outlet for the accepted treated stock is located at the upper end, whereas the liquid or liquid mixtures to be treated are tangentially introduced through one or more inlets located at or near the enlarged lower end of the device, the foam and other undesirable material being withdrawn or allowed to flow out through a central outlet at the lower end. The main wall portions of the device are of a generally conical shape, and of a shape such that each vertical cross-section thereof is curved as in said prior application, except inverted. Also, the upper apex end is provided with means which will be referred to as a "core trap" at which the vortex flow is terminated and partly reversed and from which only the treated liquid in the peripheral portions is allowed to escape through the treated stock outlet.

For reasons hereinafter explained, the device of this invention as thus arranged provides a highly efficient means for separating not only foam from treated stock, but also materials such as asphalt and pitch accumulations, oils and scums, and ink particles which have been dislodged from pulp and paper stock by deinking processes. The device is also well adapted for mineral flotation classification work.

Various further and more specific objects, features and advantages of the invention will appear from the detailed description given below, taken in connection with the accompanying drawings which form a part of this specification and illustrate merely by way of example, preferred forms of apparatus for the practice of the invention. The invention consists of such novel features, arrangements and combinations of parts and method steps as may be shown and described herein.

In the drawings:

Fig. 1 is a vertical sectional view of a presently preferred example of the device according to the present invention;

Fig. 2 is a view taken substantially along line 2—2 of Fig. 1 and looking downwardly; and Fig. 3 is an enlarged vertical sectional view of the upper portion of the device of Fig. 1.

Referring now to the drawings in further detail, in the device as shown in Fig. 1, one or more tangential inlet conduits are provided as at 10 and located near the lower portion of a main vortex chamber 11. The side walls of this chamber, as shown, are generally conical, although each vertical cross-section thereof approximately follows a logarithmic curve, as well be hereinafter described. In order to facilitate manufacture of the side walls, same may be formed as truncated conical shells, one superimposed above the next and the same being joined as by welding along lines such as indicated at 12, 13, 14, etc. That is, of course, flat sheet metal may readily be used by curving same to form such "straight-sided" conical portions, whereas it would be considerably more difficult actually to curve each element of the wall portions throughout strictly according to a logarithmic curve. But by making the chamber in sections as shown, the desired curvature may be followed with a sufficiently close degree of approximation to give the desired results in practice.

The lower or bottom end of the device may be of a generally dished shape as indicated at 15. As shown, this portion is made of a shallow conical shape, but other annular dished shapes may be used, and the bottom might even be generally flat.

At the upper and apex end of the conical chamber, the headpiece 17 is secured as by flanged connecting portions 18, this headpiece containing as its upper end wall, a baffle means extending generally transversely of the vortex axis preferably as a blunt downwardly directed and generally conical portion 19 just beneath which there is provided an annular slit 20 located just above the wall portion 21, within which the upper end of the liquid vortex is contained. As shown in Figs. 1 and 3, the width of the outlet at the upper end of the chamber is somewhat less than the thickness of the upwardly flowing layer. The annular slit 20 opens to a generally annular surrounding chamber portion 22 within which such of the treated stock as is discharged through the annular slit swirls around, as indicated by the arrows in Fig. 2, and out through a treated stock outlet connection 23. This outlet may be connected to a suction or vacuum pump.

The bottom of the device is provided with a central discharge outlet 25 through which the separated foam and other material desired to be separated is discharged, either by gravity through an extended pipe, or possibly a barometric leg, or, as shown, into a closed chamber 26. Such chamber may have its upper portions connected as by conduit 27 to evacuating means such as a vacuum pump, and its lower portions which contain liquid and other accumulations, may be connected by a conduit 28 to a liquid pump or other discharge means. Pressure indicating gauges as at 40 may be provided at various points, as shown.

In operation, the liquid mixture to be treated is introduced at such a rate and velocity that vortex flows thereof will occur in the chamber, generally as indicated by the dotted lines and the various arrows shown in Fig. 1, and which will shortly be described. The various factors entering into the construction and operation of the device are calculated to cause approximately these vortex flow patterns, although the exact form of the patterns may vary more or less under varying conditions at various points therein. The flow pattern, substantially as indicated, for an example hereinafter described, was observed to occur in the device when provided with transparent wall portions for inspection purposes.

The liquid enters the tangential inlet 10 and is immediately subjected to centrifugal forces which cause gas bubbles therein and light particles to be forced toward the core, indicated at 30. Such centrifugal action on the liquid and the consequent exclusion therefrom of small bubbles, continues as long as the liquid remains in the device. Some of the entering liquid, as well as some of the liquid already present, promptly starts to flow helically upward, as indicated at 31, along close to the wall and externally of a "neutral zone" indicated by the dotted lines 32, and which occurs at locations spaced inwardly from the walls and along regions, the vertical elements of which are approximately parallel to the curved vertical elements of the wall. As this liquid spirals upwardly, pressure therein is reduced, but bubbles continue to be thrown therefrom and gathered to the core. Since the horizontal cross-sectional area of this upwardly moving vortex portion which is outside the "neutral zone" becomes smaller and smaller, more and more of this upwardly moving liquid will be forced inwardly through the "neutral zone" as indicated by the small curved arrows 33. The remainder of the upward helical flow close to the walls, will, upon arriving at the top of the device, be substantially wholly free of gas bubbles and foam, and thus in ideal condition to be allowed to pass out through the annular slit 20 and to the treated stock outlet. But the blunt cone 19 within the top of the device, will cause such portions of the helical flow as are spaced substantially from the side walls, to be reversed and to spiral downwardly, as indicated by the lines and arrows 35, within the portion of the chamber spaced inside the "neutral zone" 32, but surrounding the core 30.

The central core 30 will be substantially free of liquid, at least in its inner portions, and is thus maintained because of the centrifugal forces which fling the liquid outwardly, when taken in conjunction with the continual drainage, through the central bottom outlet 25, of such material which would otherwise tend to collect in the core.

The design of the "core trap" comprising the blunt cone 19 at the top, and associated structure, is such as to prevent the gases and foam in or adjacent the core from being sucked out with the gas-free treated stock. Instead, the liquid next to the core, including foam and undesired material, tends to fall toward the bottom. In transit, this liquid is continuously encountering the bubbles being gathered to the core and the bubbles will carry with them materials of such a nature as those to which bubbles tend to adhere, for example, oils, fats, tar and asphalt accumulations or ink particles. The downwardly falling inner vortex portions will gain energy such that same will increase in velocity until they impinge against the bottom 15 and move by centrifugal force outwardly to blend with the entering liquid which passes helically up outside the "neutral" area 32. Thus considerable portions of the liquid will be "recycled" for two or more treatments by reason of the fact that they will flow helically upwardly along the walls and thence helically downward, and only those portions closest to the walls which have been most intensely subjected to centrifugal forces and which are thus substantially free of the undesired bubbles or other material, will be discharged through the annular slit 20 at the top.

The bubbles and undesired material brought with them, together with floating particles, collect at the core. These bubbles may break and leave the undesired material or particles at the core, or remain with the particles as a strong foam. In the latter case, the foam is rapidly blown out of the device by the continuing arrival of gas into the core. If the nature of the bubbles is such that they break, they will leave behind them the undesired material which they carried and same will be discharged at the bottom outlet along with a skin of liquid as indicated at 40, which leaves by way of such outlet. The continued arrival of bubbles tends to keep such undesired material or particles at the core and to concentrate them there in the liquid immediately surrounding the core as it is flowing down to the bottom outlet.

While the curvature of the vertical elements of the cone as above referred to, is preferable, but not essential, to the use of the device as a foam and gas removing means, yet such curvature is important to the achievement of efficient removal of the other material such as above referred to, and which tends to cling to the bubbles.

The particular example of the device as shown in Fig. 1, was designed with a height of about 71 inches from the bottom outlet to the top outlet and is well adapted for the treatment of about 75 U.S. gallons per minute of pulp stock such as in paper or pulp mills. At the inlet, the stock may be introduced under a vacuum equivalent to that of about a five inch mercury column or at a slight positive pressure, say, up to 2 p.s.i. The treated stock may be discharged at the top outlet under a vacuum equivalent to that of fifteen to twenty-two inches of mercury, for example, the flow of accepted stock being variable from 45 to 60 U.S. gallons per minute. At the bottom reject outlet, the flow may be varied from 15 to 30 U.S. gallons per minute under a vacuum equivalent to about 27 inches of mercury in the core. These figures are merely illustrative. The device may alternatively be operated without vacuum pumps. For example, with an inlet pump giving a substantial inlet pressure (say about 50 p.s.i.) the accepted stock outlet pressure may be for example about 12 p.s.i. Then a long downwardly extending rejects outlet pipe may be used, causing for example an 18 inch Hg vacuum in the core. For such an example, a two inch inlet pipe was selected as appropriate, and this provided an inlet velocity of 7.15 feet per second, which has been found satisfactory by experience as giving good results under a variety of circumstances. The rejects outlet opening is made of a size depending upon the proportion of the flow which it is desired to reject and separate from the treated stock. For a typical case, this outlet may be of about one and one-half inches in diameter. Since this outlet is largely filled with the gas core, such a size is not excessive since only a relatively thin peripheral layer of the liquid will discharge through this outlet. Since the diameter of this bottom outlet in effect establishes the diameter of the liquid column to be rejected downwards from the blunt cone 19 at the top, calculations were made with a view to establishing a theoretical two-inch diameter for the "neutral zone" at the top. That is, the radius "R," hereinafter referred to, for such a zone at the top, was one inch.

In order to design the curvature of the "neutral zone"

with theoretical accuracy, it would be necessary to take into account energy losses due to friction in the vortices and the consequent velocity changes across the film moving upwardly along the walls of the device, with a time of retention of the liquid in the device of about 30 seconds, and with examples such as above referred to, the velocity across such film has been found to be substantially constant and the same at all of the different radii. Hence, with the examples above referred to, as well as in a variety of other examples, the frictional resistance prevents velocity increase. Also, in computing the curvature of the "neutral zone," the axial pressure drop theoretically should be taken into account. Based on experience in units of the above-mentioned velocity range and type, it has been found that: $\Delta P = 2\rho$, where:

$\Delta P$ equals the axial pressure drop in the "neutral zone" per unit of length (for practical purposes assumed as constant); and $\rho$ equals density of the liquid.

A formula may be mathematically derived for determining theoretically the curvature of the desired "neutral zone" utilizing the data and assumptions above discussed, as follows:

$$h = \frac{\rho k^2}{(\Delta P - \rho)g} \log_e \frac{r}{R}$$

where:

$k$ is a constant which, with appropriate allowance for vortex friction as above discussed, equals the intake velocity V, which in turn, as per the above-described example, equals 7.17 ft./sec.;
$\Delta P$ equals $2\rho$, as above explained;
R equals one inch (as above stated);
$g$ equals 32.2, viz. the acceleration of gravity;
$h$ is the vertical distance between the top of the "neutral zone" curve down to any point thereon; and
$r$ is the distance between said point and the axis of the vortex.

Hence, upon multiplying by 12 (in order that $r$ and $h$ will be expressed in inches), we have:

$$h = \frac{12 \times (7.17)^2}{32.2} \log_e \frac{r}{1}$$

Thus with assumptions and conditions like or generally similar to those explained for the examples above referred to, the formula for the curvature of the "neutral zone" (as well as approximately the formula for the curvature of the adjacent wall elements substantially parallel thereto) may be given as follows:

$$h = \frac{V^2}{g} \log_e \frac{r}{R}$$

Thus a large number of different devices may be made according to the invention, each with walls of different curvatures depending essentially upon the intake velocity with which each is to be used. In designing the curvature of the walls for the device, a curve may, of course, be plotted on graph paper according to the above formula, to represent the curvature of the "neutral zone." Then one may choose the desired thickness of the layer of liquid which is to spiral upwardly outside the "neutral zone." For examples like or similar to those above referred to, this layer may be approximately one inch in thickness. Then the shape of the metal wall may be drawn on the graph paper at this distance of one inch to one side the neutral layer curve. Finally, the desired resulting wall curve in practice is approximated as above explained, by using a reasonable number of "straight" conical sections.

Although certain particular embodiments of the invention are herein disclosed for purposes of explanation, various further modifications thereof, after study of this specification, will be apparent to those skilled in the art to which the invention pertains. Reference should accordingly be had to the appended claims in determining the scope of the invention.

What is claimed and desired to be secured by Letters Patent is:

1. Apparatus for separating foam and undesired material accumulating in foam from liquids and liquid suspensions and mixtures comprising: a chamber for containing a vortex formation and having side walls of the general shape of an upright cone; tangentially directed liquid inlet means adjacent the lower part of such chamber; closure means for the bottom of the chamber; an outlet at the center of the bottom of the chamber for discharging the foam and material accumulated therein; means for causing stock to be treated to flow in through said inlet at a predetermined velocity, to then flow helically in a layer upwardly along said side walls; baffle means including a blunt downwardly directed and generally conical member extending transversely of the upper end of the chamber and being so positioned relatively to the upper end of said side walls as to define therewith a narrow annular outlet for the accepted treated stock, said outlet being concentric with the upper end of the chamber; whereby substantially a major portion of the accepted treated stock escapes through said narrow annular outlet at the top while the remaining portions of the stock are reversed by said baffle means.

2. Apparatus for separating foam and undesired material accumulating in foam from liquids and liquid suspensions and mixtures comprising: a chamber for containing a vortex formation and having side walls of the general shape of an upright cone; tangentially directed liquid inlet means adjacent the lower part of such chamber; closure means for the bottom of the chamber; an outlet at the center of the bottom of the chamber for discharging the foam and material accumulated therein; baffle means including a blunt downwardly directed and generally conical member extending transversely of the upper end of the chamber and being so positioned relatively to the upper end of said side walls as to define therewith a narrow annular outlet for the accepted treated stock, said outlet being concentric with the upper end of the chamber, whereby substantially a major portion of the accepted treated stock escapes through said narrow annular outlet at the top while the remaining portions of the stock are reversed by said baffle means; and means for causing stock to be treated to flow through said inlet at a predetermined velocity V, said walls being so shaped that the vertical elements thereof extend approximately along a curve conforming to the equation:

$$h = \frac{V^2}{g} \log_e \frac{r}{R}$$

where $h$ is the vertical distance between the top of the chamber down to any point thereon;
V is the aforesaid velocity of the introduced liquid;
$g$ is the acceleration of gravity;
$r$ is the distance between said point and the axis of the chamber; and
R is the value of $r$ at the upper end of said chamber.

3. Apparatus for separating foam and undesired material accumulating in foam from liquids and liquid suspensions and mixtures comprising: a chamber for containing a vortex formation and having side walls of the general shape of an upright cone; tangentially directed liquid inlet means adjacent the lower part of such chamber; closure means for the bottom of the chamber; an outlet at the center of the bottom of the chamber for discharging the foam and material accumulated therein; said walls being so shaped that the vertical elements thereof near the lower part of the chamber curve inwardly and upwardly and progressively more upwardly nearer the top of the chamber; and means for causing stock to be treated to flow in through said inlet at a predetermined velocity to then flow helically in a layer upwardly along said walls; and baffle means including a blunt downwardly directed and generally conical member extending transversely of the upper end of the chamber and being so positioned relatively to the upper end of said side walls as to define therewith a narrow annular outlet for the accepted treated stock, said outlet being concentric with the upper end of the chamber whereby substantially a major portion of the accepted treated stock escapes through said narrow annular outlet at the top while the remaining portions of the stock are reversed by said baffle means.

References Cited in the file of this patent

UNITED STATES PATENTS

| | | |
|---|---|---|
| 2,346,005 | Bryson | Apr. 4, 1944 |
| 2,649,963 | Fontein | Aug. 25, 1953 |
| 2,655,263 | Chisholm | Oct. 13, 1953 |
| 2,757,582 | Freeman et al. | Aug. 7, 1956 |
| 2,765,867 | Ravallier et al. | Oct. 9, 1956 |
| 2,817,441 | Leeman | Dec. 24, 1957 |
| 2,849,930 | Freeman et al. | Sept. 2, 1958 |